US012792764B2

(12) United States Patent
Kuznetsov et al.

(10) Patent No.: US 12,792,764 B2
(45) Date of Patent: Nov. 10, 2026

(54) DATA CLEANROOM COLLABORATIONS CONTROL AND MEMBERSHIP RESTRICTIONS

(71) Applicant: Snowflake Inc., Bozeman, MT (US)

(72) Inventors: Valentin K. Kuznetsov, Bellevue, WA (US); Henry Liu, Cupertino, CA (US); David Schultz, Piedmont, CA (US)

(73) Assignee: Snowflake Inc., Bozeman, MT (US)

( * ) Notice: Subject to any disclaimer, the term of this patent is extended or adjusted under 35 U.S.C. 154(b) by 182 days.

(21) Appl. No.: 18/619,649

(22) Filed: Mar. 28, 2024

(65) Prior Publication Data

US 2025/0307449 A1 Oct. 2, 2025

(51) Int. Cl.
*G06F 21/62* (2013.01)

(52) U.S. Cl.
CPC ...... *G06F 21/6227* (2013.01); *G06F 21/6218* (2013.01); *G06F 2221/2141* (2013.01)

(58) Field of Classification Search
CPC ...... G06F 21/60; G06F 21/62; G06F 21/6218; G06F 21/6227; G06F 2221/21; G06F 2221/2141
See application file for complete search history.

(56) References Cited

U.S. PATENT DOCUMENTS 11,567,943 B1 * 1/2023 Blum .................. G06F 16/2443
2021/0279357 A1 * 9/2021 Das ..................... G06F 21/6227

* cited by examiner

*Primary Examiner* — D'Arcy Winston Straub
(74) *Attorney, Agent, or Firm* — Schwegman Lundberg & Woessner, P.A.

(57) ABSTRACT

Some embodiments include receiving a first query directed towards a shared dataset, accessing a first set of data from the shared dataset to perform the one or more functions, determining that a row access policy is to be enforced in relation to the first query, and generating an output to the first query based on an execution of the one or more functions.

15 Claims, 10 Drawing Sheets

DATA CLEANROOM COLLABORATIONS CONTROL AND MEMBERSHIP RESTRICTIONS

TECHNICAL FIELD

Embodiments of the disclosure relate generally to cloud data platforms and, more specifically, to data cleanroom collaborations control and membership restrictions.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to types of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. Indeed, the data platform may include one or more databases that are respectively maintained in association with any number of customer accounts, as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well.

Users and/or executing processes that are associated with a given customer account may, via one or more types of clients, be able to cause data to be ingested into the database, and may also be able to manipulate the data, add additional data, remove data, run queries against the data, generate views of the data, and so forth.

When certain information is to be extracted from a database, a query statement may be executed against the database data. A data platform may process the query and return certain data according to one or more query predicates that indicate what information should be returned by the query. The data platform extracts specific data from the database and formats that data into a readable form.

BRIEF DESCRIPTION OF THE SEVERAL VIEWS OF THE DRAWINGS

In the drawings, which are not necessarily drawn to scale, like numerals may describe similar components in different views. Some non-limiting examples are illustrated in the figures of the accompanying drawings in which.

DETAILED DESCRIPTION

Figure 1:
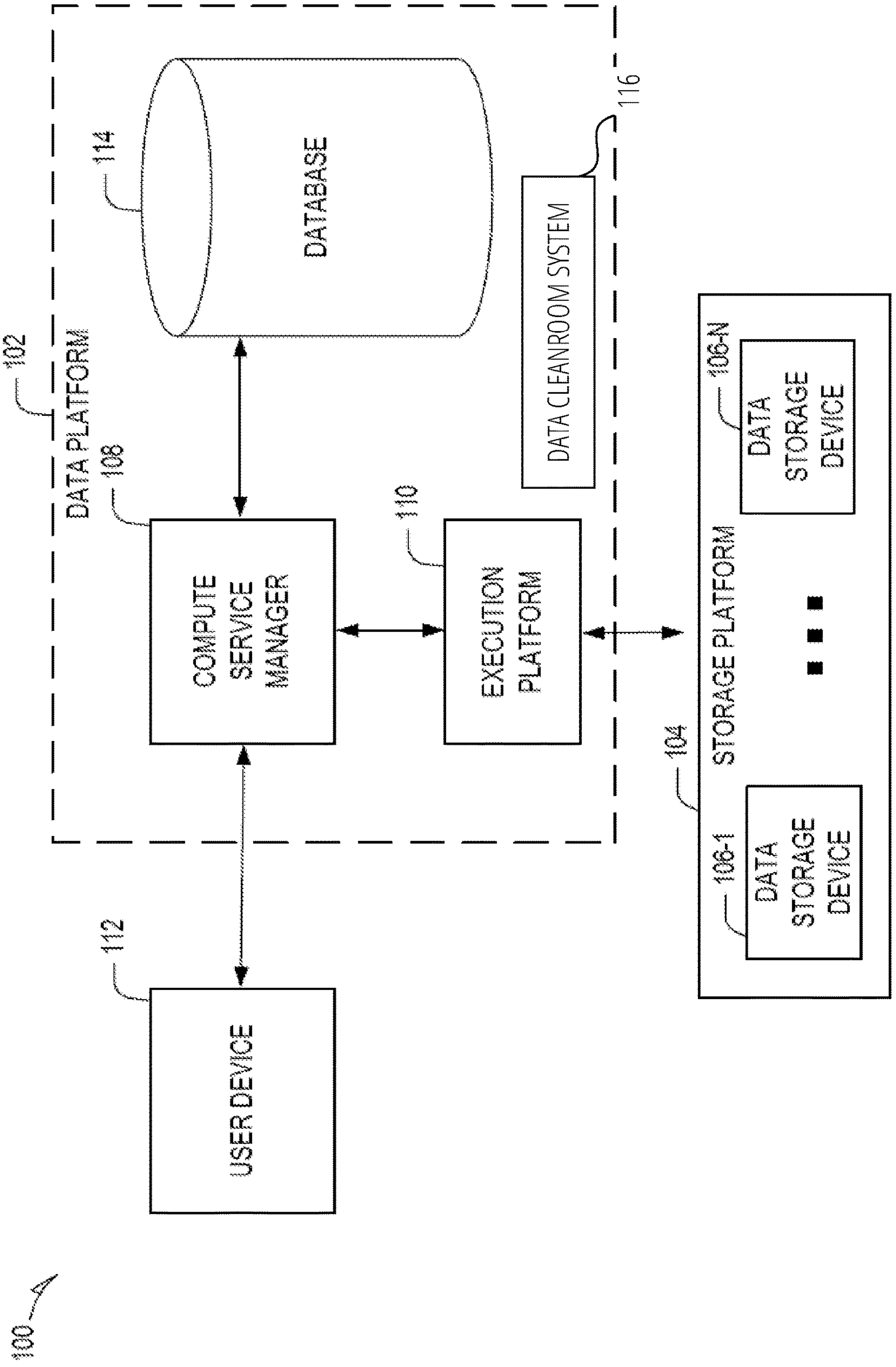
FIG. 1 illustrates an example computing environment in which a network-based database system can implement projection constraints, according to some example embodiments.

Reference will now be made in detail to specific example embodiments for carrying out the inventive subject matter. Examples of these specific embodiments are illustrated in the accompanying drawings, and specific details are set forth in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The rise of data cleanroom technology, particularly in cloud services, introduces complexities in data sharing among multiple entities while ensuring privacy and control. In a conventional scenario, where data cleanrooms facilitate collaboration between, say, Company A and Company B, potential threats emerge when Company B, unbeknownst to Company A, collaborates with a third-party entity, like Company C. This unrestricted collaboration jeopardizes the integrity of shared data, especially when Company A and Company C are competitors.

Traditional systems lack mechanisms to prevent such unauthorized data mingling. For instance, if Company A shares data with Company B in a cleanroom, Company B might combine datasets from both Company A and Company B. Subsequently, Company B might further amalgamate this data with Company C, unbeknownst to Company A. This not only undermines data privacy but also grants undue control to Company B over Company A's sensitive information, potentially harming competitive dynamics.

The existing framework of traditional systems fail to address these concerns adequately. Current mechanisms lack the granularity required to enforce membership restrictions within data cleanrooms, thereby exposing shared datasets to potential misuse. The absence of controls over consumer-side manipulations further exacerbates the vulnerability of shared data.

To mitigate and/or eliminate the risks associated with unauthorized data mingling, some embodiments described herein introduce effective controls within and external to data cleanrooms. The mechanism involves attaching row access policies to shared datasets, and dictating permissible interactions based on pre-defined membership lists. For instance, if Company A specifies Company B, C, E, F, and G as permissible data recipients, the data platform enforces strict access policies accordingly regardless of whether the query is performed within or external to the data cleanroom.

In some cases, the solution incorporates an SQL function that assesses queries to ensure compliance with membership restrictions. The SQL function checks that only datasets from an allow list of accounts are allowed to be intermeshed (through a join) in a query. To enforce membership restriction the data cleanroom will automatically attach row access policies that use this function to all datasets and user defined functions (UDF) shared within the cleanroom. For example, data provider B cannot use a UDF shared by data provider A on data provider C's data, and vice versa. Thus, when the data is used outside of the cleanroom, the data platform can check the allow lists to see if parties external to the data cleanroom are allowed to use this data.

This function identifies all participating entities referenced directly or indirectly within a query, enabling the data platform to enforce allow-lists and/or disallow-lists effectively. By restricting data intermeshing to specified accounts, the solution safeguards against unauthorized collaborations and preserves data integrity within cleanroom environments.

Moreover, the solution introduces practical implementation strategies, such as applying membership restrictions at the query level. This granular approach empowers providers to monitor and regulate data interactions comprehensively, mitigating the risks associated with unauthorized data sharing. Through robust enforcement mechanisms and enhanced visibility into query dynamics, the proposed solution establishes a framework for secure and accountable data collaboration within cleanroom environments.

FIG. 1 illustrates an example computing environment 100 that includes a data platform 102 in communication with a storage platform 104, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the data platform 102 and the storage platform 104 (e.g., AWS®, Microsoft Azure Blob Storage®, or Google Cloud Storage®). The data platform 102 is used for reporting and analysis of integrated data from one or more disparate sources including storage devices 106-1 to 106-N within the storage platform 104. The storage platform 104 comprises a plurality of computing machines and provides on-demand computer system resources such as data storage and computing power to the data platform 102.

The data platform 102 comprises a compute service manager 108, an execution platform 110, and a database 114. The data platform 102 hosts and provides data reporting and analysis services to multiple client accounts. Administrative users can create and manage identities (e.g., users, roles, and groups) and use permissions to allow or deny access to the identities to resources and services.

The compute service manager 108 coordinates and manages operations of the data platform 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a user device 112. The user device 112 corresponds to a user of one of the multiple client accounts supported by the data platform 102. In some embodiments, the compute service manager 108 does not receive any direct communications from the user device 112 and only receives communications concerning jobs from a queue within the data platform 102.

The compute service manager 108 is also coupled to database 114, which is associated with the data stored in the computing environment 100. The database 114 stores metadata pertaining to various functions and aspects associated with the data platform 102 and its users. In some embodiments, the database 114 includes a summary of data stored in remote data storage systems as well as data available from a local cache. Additionally, the database 114 may include information regarding how data is organized in remote data storage systems (e.g., the storage platform 104) and the local caches. The database 114 allows systems and services to determine whether a piece of data needs to be accessed without loading or accessing the actual data from a storage device.

For example, the database 114 can include metadata that includes information about data stored in the table such as minimum and maximum values stored in particular portions of the table. For example, as noted above, a table may be organized into multiple granular storage units such as micro-partitions. The multiple storage units may be stored (e.g., as files) across multiple blocks (or compression blocks). That is, a block may comprise a set of storage units (e.g., partitions or micro-partitions) and the set of storage units may be a subset of the multiple storage units into which the table is organized. The metadata associated with the table may specify a minimum and maximum value for each storage unit as well as each block. The metadata stored in the database 114 can be used by one or more components of the data platform 102 (e.g., to perform pruning during query processing). In an example, given a query directed at a table organized into storage units (e.g., a set of micro-partitions), one or more components of the data platform 102 can use the metadata to identify a reduced set of storage units to scan in executing the query. The set of storage units to scan in executing a query may be referred to herein as a "scan set."

The compute service manager 108 is further coupled to the execution platform 110, which provides multiple computing resources that execute various data storage and data retrieval tasks. The execution platform 110 comprises a plurality of compute nodes. A set of processes on a compute node executes at least a portion of a query plan compiled by the compute service manager 108.

The execution platform 110 is coupled to storage platform 104 of the storage platform 104. The storage platform 104 comprises multiple data storage devices 106-1 to 106-N. In some embodiments, the data storage devices 106-1 to 106-N are cloud-based storage devices located in one or more geographic locations. For example, the data storage devices 106-1 to 106-N may be part of a public cloud infrastructure or a private cloud infrastructure. The data storage devices 106-1 to 106-N may be hard disk drives (HDDs), solid state drives (SSDs), storage clusters, Amazon S3™ storage systems or any other data storage technology. Additionally, the storage platform 104 may include distributed file systems (e.g., Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 106-1 to 106-N are decoupled from the computing resources associated with the execution platform 110. This architecture supports dynamic changes to the data platform 102 based on the changing data storage/retrieval needs as well as the changing needs of the users and systems. The support of dynamic changes allows the data platform 102 to scale quickly in response to changing demands on the systems and components within the data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 108, database 114, execution platform 110, and storage platform 104 are shown in FIG. 1 as individual discrete components. However, each of the compute service manager 108, database 114, execution platform 110, and storage platform 104 may be implemented as a distributed system (e.g., distributed across multiple systems/platforms at multiple geographic locations). Additionally, each of the compute service manager 108, database 114, execution platform 110, and storage platform 104 can be scaled up or down (independently of one another) depending on changes to the requests received and the changing needs of the data platform 102. Thus, in the described embodiments, the data platform 102 is dynamic and supports regular changes to meet the current data processing needs.

During typical operation, the data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the database 114 assists the compute service manager 108 in determining which nodes in the execution platform 110 have already cached at least a portion of the data needed to process the task. One or more nodes in the execution platform 110 process the task using data cached by the nodes and, if necessary, data retrieved from the storage platform 104. It is desirable to retrieve as much data as possible from caches within the execution platform 110 because the retrieval speed is typically much faster than retrieving data from the storage platform 104.

As shown in FIG. 1, the computing environment 100 separates the execution platform 110 from the storage platform 104. In this arrangement, the processing resources and cache resources in the execution platform 110 operate independently of the data storage devices 106-1 to 106-N in the storage platform 104. Thus, the computing resources and cache resources are not restricted to specific data storage devices 106-1 to 106-N. Instead, all computing resources and all cache resources may retrieve data from, and store data to, any of the data storage resources in the storage platform 104.

Figure 2:
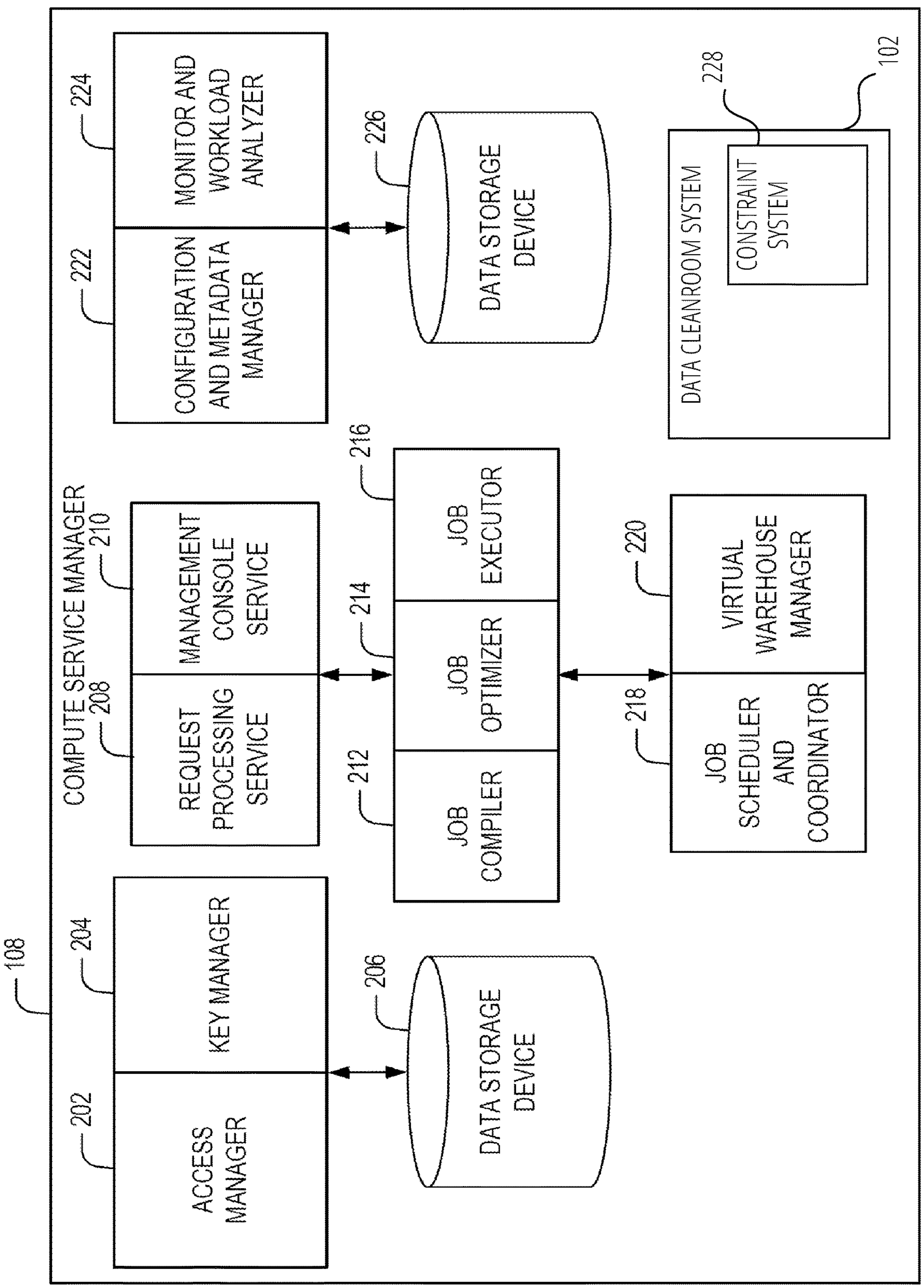
FIG. 2 is a block diagram illustrating components of a compute service manager, according to some example embodiments.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in storage platform 104). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110, any one of which may be configured (e.g., by the virtual warehouse manager 220) to include any one or more of a table scan operator and a top k operator. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which storage unites need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the data platform 102. For example, data storage device 226 may represent caches in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 of FIG. 3) may need to communicate with another execution node (e.g., execution node 302-2 of FIG. 3), but should be disallowed from communicating with a third execution node (e.g., execution node 312-1), and any such illicit communication can be recorded (e.g., in a log or other location). Also, the information stored on a given execution node is restricted to data relevant to the current query, and any other data is unusable, rendered so by destruction or encryption where the key is unavailable.

The data cleanroom system 116 allows for dynamically restricted data access to shared datasets, as depicted and described in further detail below. The constraint system 228 provides for projection constraints on data values stored in specified columns of shared datasets, as discussed in further detail below. An aggregation system can be implemented within the cloud data platform 102 when processing queries directed to tables in shared datasets. In some embodiments, the aggregation system can be implemented within a cleanroom provided by the data cleanroom system 116 and/or in conjunction with the constraint system. In some cases, the data cleanroom system includes the constraint system 228.

The constraint system enables entities to establish projection constraints (e.g., projection constraint policies) to shared datasets. A projection constraint identifies that the data in a column may be restricted from being projected (e.g., presented, read, outputted) in an output to a received query, while allowing specified operations to be performed on the data and a corresponding output to be provided. For example, the projection constraint may indicate a context for a query that triggers the constraint, such as based on the user that submitted the query.

For example, the constraint system may provide a user interface or other means of communication that allows entities to define projection constraints in relation to their data that is maintained and managed by the cloud data platform 102. To define a projection constraint, the constraint system enables users to provide data defining the shared datasets and columns to which a projection constraint should be associated (e.g., attached). For example, a user may submit data defining a specific column and/or a group of columns within a shared dataset that should be attached with the projection constraint.

Further, the constraint system enables users to define conditions for triggering the projection constraint. This may include defining the specific context and/or contexts that triggers enforcement of the projection constraint. For example, the constraint system may enable users to define roles of users, accounts and/or shares, which would trigger the projection constraint and/or are enabled to project the constrained column of data. After receiving data defining a projection constraint, the constraint system generates a file that is attached to the identified columns. In some embodiments, the file may include a Boolean function based on the provided conditions for the projection constraint. For example, the Boolean function may provide an output of true if the projection constraint should be enforced in relation to a query and an output of false if the projection constraint should not be enforced in relation to a query. Attaching the file to the column establishes the projection constraint to the column of data for subsequent queries.

The constraint system receives a query directed to a shared dataset. The query may include data defining data to be accessed and one or more operations to perform on the data. The operations may include any type of operations used in relation to data maintained by the cloud data platform 102, such as join operation, read operation, and the like. The constraint system may provide data associated with the query to the other components of the constraint system, such as a data accessing component, a query context determination component, or other components of the constraint system. The constraint system accesses a set of data based on a query received by the constraint system or a component thereof. For example, the data accessing component may access data from columns and/or sub-columns of the shared dataset that are identified by the query and/or are needed to generate an output based on the received query. The constraint system may provide the accessed data to other components of the constraint system, such as a projection constraint enforcement component. The constraint system determines the columns associated with the data accessed by the constraint system in response to a query. This can include columns and/or sub-columns from which the data was accessed. The constraint system may provide data identifying the columns to the other components of the constraint system, such as a projection constraint determination component.

The constraint system determines whether a projection constraint (e.g., projection constraint policy) is attached to any of the columns identified by the constraint system. For example, the constraint system determines whether a file defining a projection constraint is attached to any of the columns and/or sub-columns identified by the constraint system. The constraint system may provide data indicating whether a projection constraint is attached to any of the columns and/or the file defining the projection constraints to the other components of the constraint system, such as an enforcement determination component.

The constraint system determines a context associated with a received query. For example, the constraint system may use data associated with a received query to determine the context, such as by determining the role of the user that submitted the query, an account of the cloud data platform 102 associated with the submitted query, a data share associated with the query, and the like. The constraint system may provide data defining the determined context of the query to the other components of the constraint system, such as an enforcement determination component.

The constraint system determines whether a projection constraint should be enforced in relation to a received query. For example, the constraint system uses the data received that indicates whether a projection constraint is attached to any of the columns and/or the file defining the projection constraints as well as the context of the query received from the constraint system to determine whether a projection constraint should be enforced. If a query constraint is not attached to any of the columns, the constraint system determines that a projection constraint should not be enforced in relation to the query. Alternatively, if a projection constraint is attached to one of the columns, the constraint system uses the context of the query to determine whether the projection constraint should be enforced. For example, the constraint system may use the context of the query to determine whether the conditions defined in the file attached to the column are satisfied to trigger the projection constraint. In some embodiments, the constraint system may use the context of the query as an input into the Boolean function defined by the projection constraint to determine whether the projection constraint is triggered. For example, if the Boolean function returns a true value, the constraint system determines that the projection constraint should be enforced. Alternatively, if the Boolean function returns a false value, the constraint system determines that the projection constraint should not be enforced. The constraint system may provide data indicating whether the projection constraint should be enforced to the other components of the constraint system, such as a projection constraint enforcement component.

The constraint system enforces a projection constraint in relation to a query. For example, the constraint system may prohibit an output to a query from including data values from any constrained columns of a shared dataset. This may include denying a query altogether based on the operations included in the query, such as if the query requests to simply output the values of a constrained column. However, the constraint system may allow for many other operations to be performed while maintaining the confidentiality of the data values in the restricted columns, thereby allowing for additional functionality compared to current solutions (e.g., tokenization). For example, the constraint system allows for operations that provide an output indicating a number of data values within a column that match a specified key value or values from another column, including fuzzy matches. As one example, two tables can be joined on a projection-constrained column using a case-insensitive or approximate match. Tokenization solutions are generally not suitable for these purposes.

The constraint system may also allow users to filter and perform other operations on data values stored in projection-constrained columns. For example, if an email-address column is projection-constrained, an analyst end-user is prevented from enumerating all of the email addresses but can be allowed to count the number of rows for which the predicate "ENDSWITH (email, 'database_123')" is true. The constraint system may provide an output to the query to a requesting user's client device.

Figure 3:
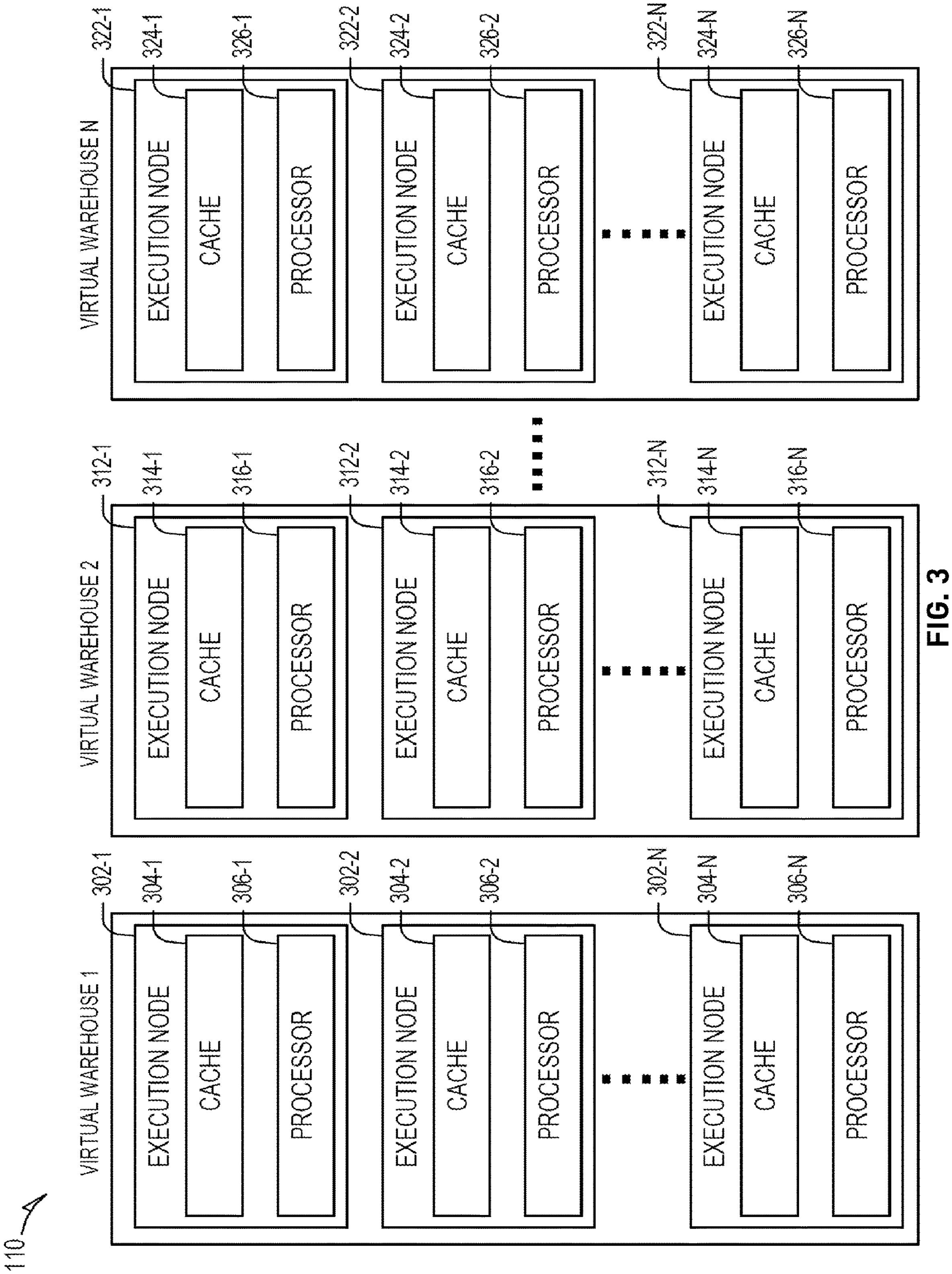
FIG. 3 is a block diagram illustrating components of an execution platform, according to some example embodiments.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse N. Each virtual warehouse includes multiple execution nodes that each includes a data cache and a processor. The virtual warehouses can execute multiple tasks in parallel by using the multiple execution nodes. All virtual warehouses can access data from any data storage device (e.g., any storage device in storage platform 104).

As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 106-1 to 106-N shown in FIG. 1. Thus, the virtual warehouses are not necessarily assigned to a specific data storage device 106-1 to 106-N and, instead, can access data from any of the data storage devices 106-1 to 106-N within the storage platform 104. Similarly, each of the execution nodes shown in FIG. 3 can access data from any of the data storage devices 106-1 to 106-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, execution nodes access data from the caches, which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet, another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

The execution platform 110 may include any number of virtual warehouses. Additionally, the number of virtual warehouses in the execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
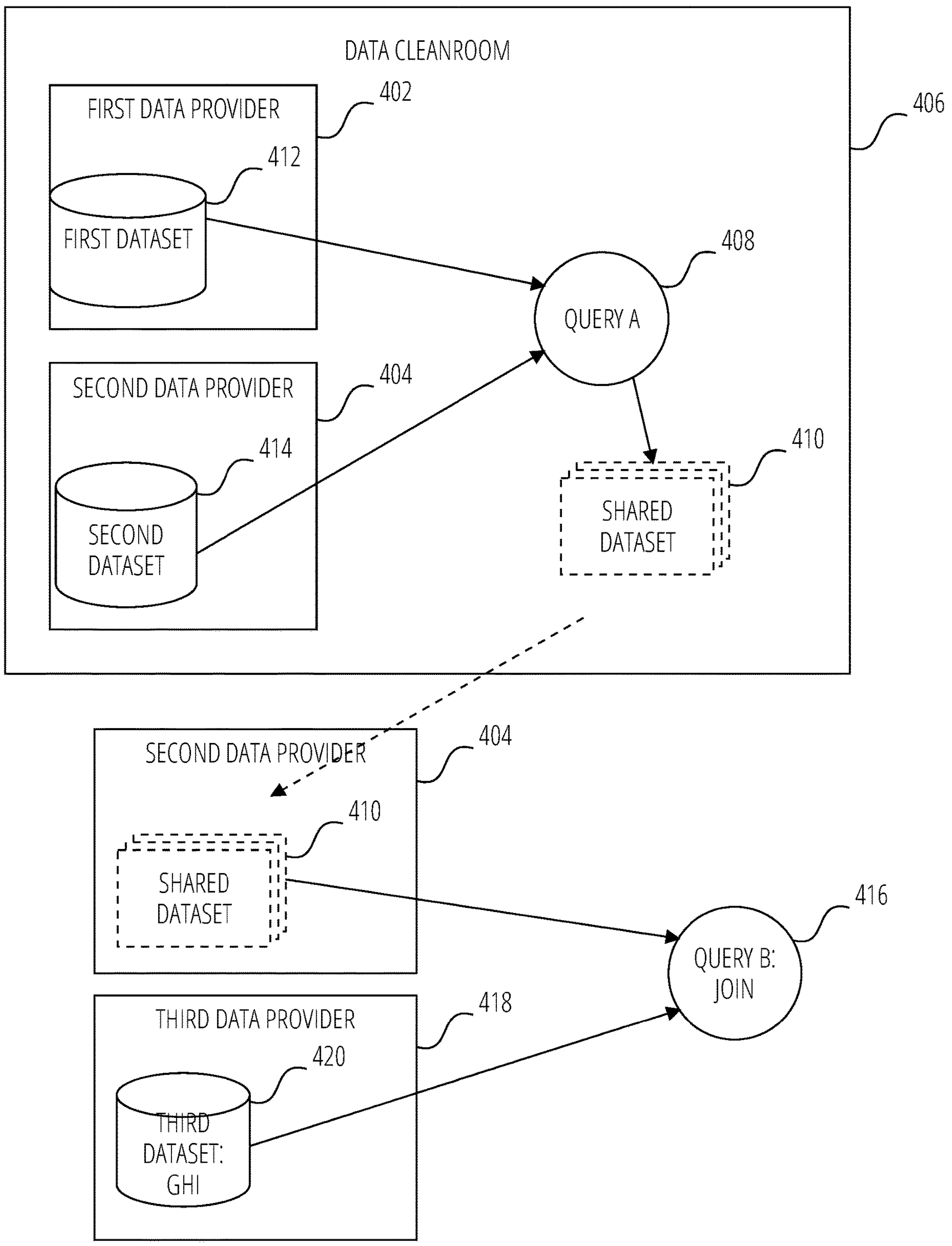
FIG. 4 is an architectural diagram illustrating unwanted comingling of competitor data, according to some example embodiments.

FIG. 4 illustrates unwanted comingling of competitor data, according to some examples. Within the ecosystem of data cleanrooms, where collaborative data sharing occurs among multiple entities, an important issue arises concerning unauthorized data mingling.

FIG. 4 includes two data providers, a first data provider 402 and a second data provider 404. These two data providers are utilizing a data cleanroom framework 406 for collaboration. Each provider contributes datasets to the cleanroom, aiming to derive insights or foster innovation without compromising data privacy. Initially, the first data provider shares its dataset, the first dataset 412, and the second data provider reciprocates with its own dataset, the second dataset 414.

A query A 408 query is executed within the cleanroom amalgamating data from both the first and second datasets. Through one or more queries and/or data transformation, a shared dataset 410 is generated that synthesizes information from both the first and second datasets. At this juncture, the second data provider gains access to the shared dataset, which contains sensitive information from the first data provider, or a derivative thereof.

Subsequently, the second data provider initiates a query B 416 (Join), incorporating the shared dataset and introducing a third dataset 420 (GHI) from a third-party third data provider 418, the third data provider 418 not being a party to the data cleanroom. In this query, the shared dataset from the cleanroom is combined with additional data from a third-party provider. The third data provider poses a significant risk to data integrity, as the third data provider is a competitor to the first data provider.

The crux of the issue lies in the unintended commingling of data. By leveraging the shared dataset within the cleanroom, the second data provider facilitates the integration of competitor data with the third data provider. This unrestricted amalgamation disregards the competitive dynamics between the first data provider and the third data provider, potentially compromising sensitive information and distorting market dynamics.

This scenario highlights a fundamental flaw in current cleanroom mechanisms. The absence of robust controls allows the second data provider to wield disproportionate influence over data interactions, inadvertently exposing the first data provider's proprietary data to competitors.

This unauthorized data mingling poses multifaceted risks and challenges. The inadvertent comingling of data from unauthorized parties grants undue insights and advantages in the market landscape, potentially skewing competitive dynamics. Moreover, the mingling of sensitive information from disparate sources compromises data privacy and security, exposing proprietary insights to unauthorized parties. Unrestricted data mingling distorts market dynamics and inhibits fair competition, as companies gain access to proprietary information without consent or oversight. Furthermore, the lack of controls and safeguards erodes trust among data providers, stifling collaboration and innovation within the cleanroom environment.

In essence, the unauthorized commingling of data within data cleanrooms represents a systemic threat to competitive integrity, data privacy, and market fairness. Addressing this issue necessitates the implementation of robust controls and mechanisms to prevent unauthorized data mingling and preserve the sanctity of collaborative data environments.

Figure 5:
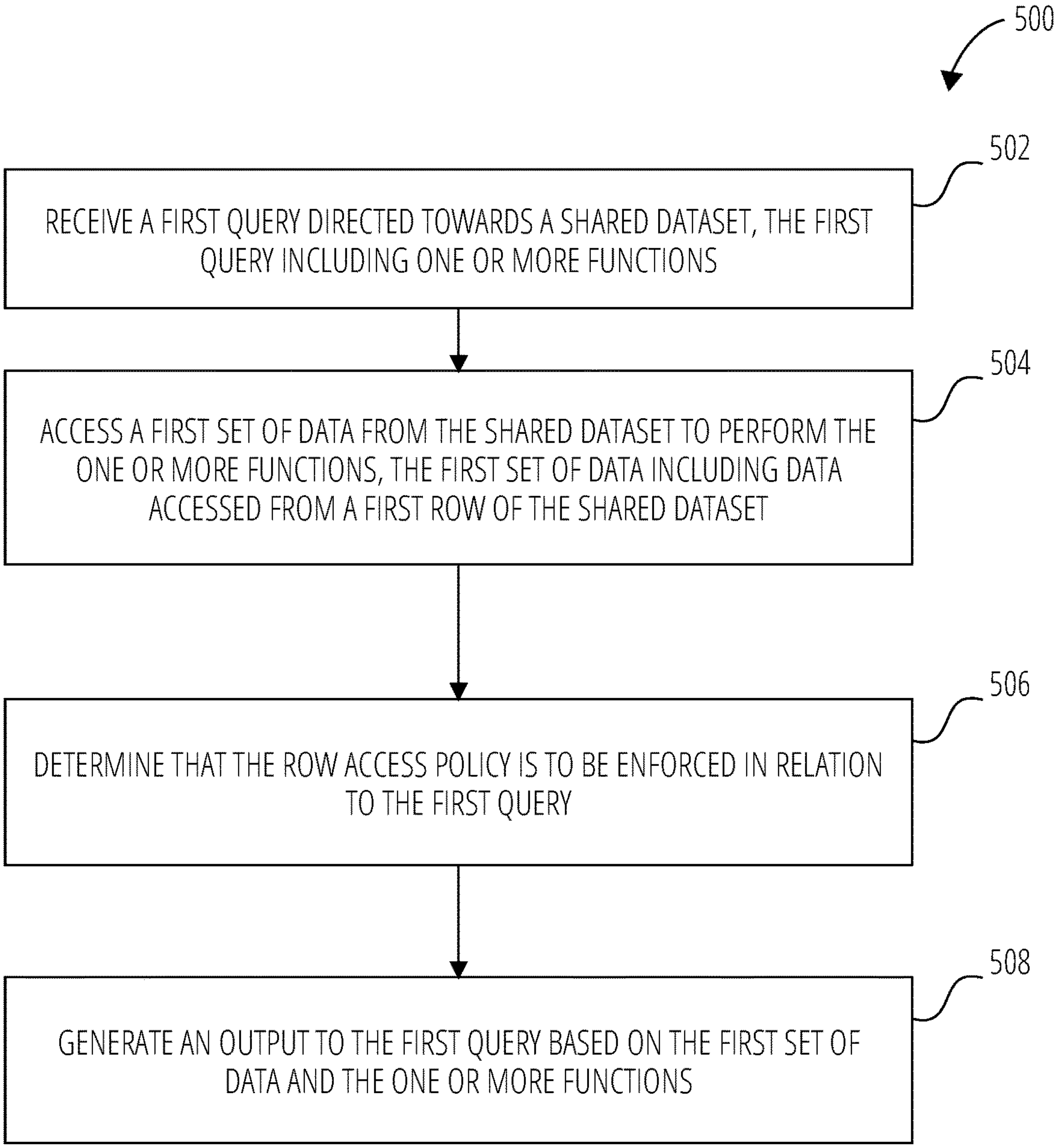
FIG. 5 is a flow diagram illustrating an example method 500 for membership restriction functions, according to some example embodiments.

FIG. 5 illustrates an example method 500 for membership restriction functions, according to some examples. The method 500 may be embodied in computer-readable instructions for execution by one or more hardware components (e.g., one or more processors) such that the operations of the method 500 may be performed by components of the data platform 102. Accordingly, the method 500 is described below, by way of example with reference thereto. However, it shall be appreciated that the method 500 may be deployed on various other hardware configurations and is not intended to be limited to deployment within the data platform 102.

Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

At operation 502, the data platform 102 receives a first query. The first query can be directed towards a shared dataset. The shared dataset can be a dataset created within a data cleanroom. The first query specifically targets the shared dataset that was created in the data cleanroom environment. However, the first query is executed outside of the data cleanroom.

The shared dataset comprises data contributed by multiple parties or entities participating in the data cleanroom collaboration. By directing the query towards the shared dataset, the user or application can extract insights or perform operations on the combined data available within the cleanroom.

Figure 6:
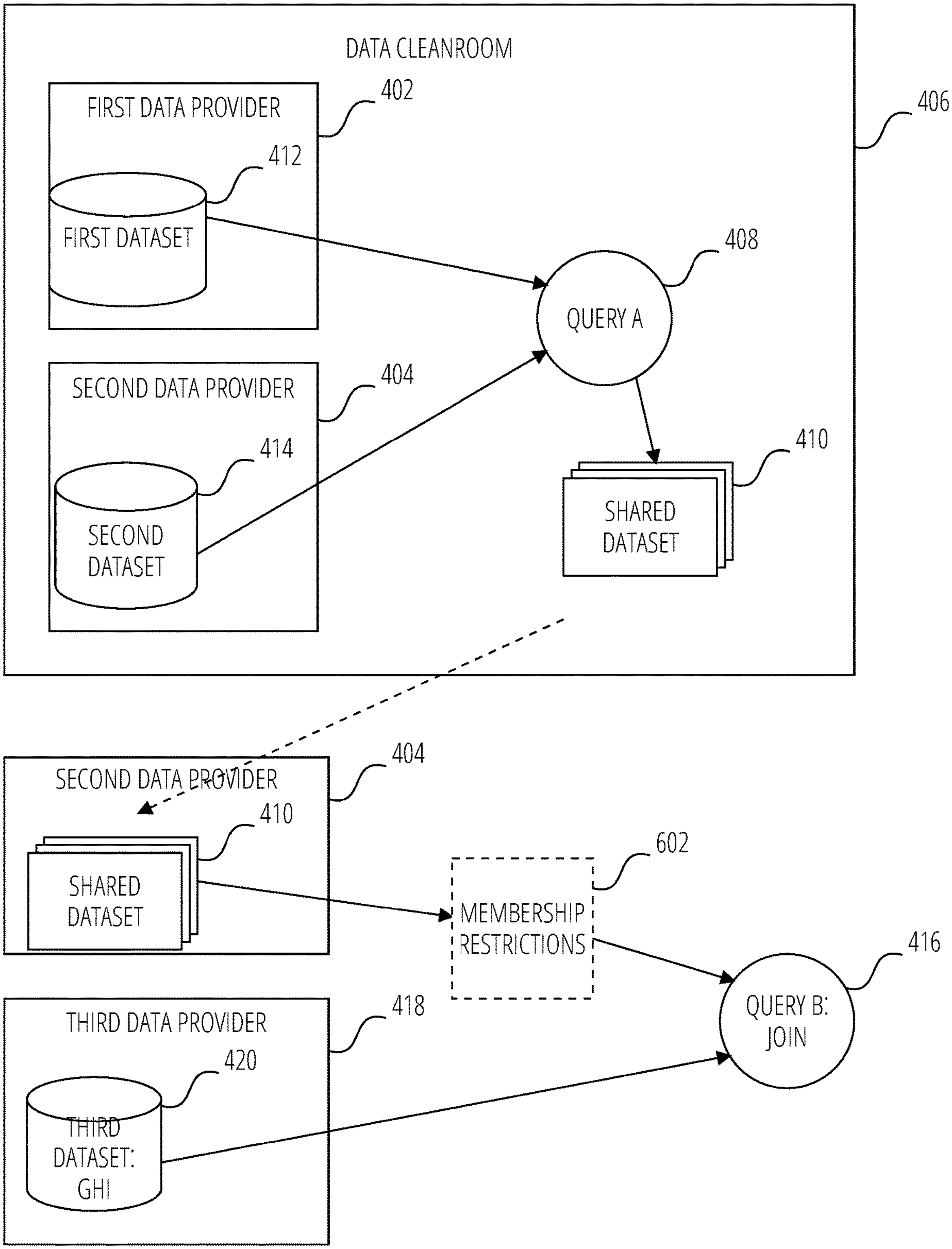
FIG. 6 is an architectural diagram illustrating application of membership restrictions, according to some example embodiments.

FIG. 6 illustrates an architectural diagram for applying membership restrictions, according to some examples. The first query can be query B 416 (join) of FIG. 6. Query B applies data from the shared dataset 410. The membership restrictions will be described below, such as when describing features related to the row access policy.

The shared dataset can be generated in a data cleanroom. The data cleanroom can be between at least a first data provider, such as the first data provider 402, and a second data provider, such as second data provider 404. Data can be shared between the first and second data providers, such as the first dataset 412 from the first data provider and the second dataset 414 from the second data provider.

The second data provider can generate a query that uses the shared dataset that was created within the data cleanroom. However, the second data provider could generate such a query with requests to datasets that are external to the data cleanroom. For example, query B applies data from the shared dataset 410 and the third dataset 420 (GHI) from the third data provider. It is important to note that the third data provider is not a member of the data cleanroom 408. Thus, even though the first data provider only enabled data sharing with the second data provider, the second data provider can, outside of the data cleanroom, mix the first data provider's data with other external data, such as the third data provider's data.

The query includes a request for information or an action to be performed on a dataset. This query can be formulated using SQL (Structured Query Language) or other programming languages suitable for data manipulation and analysis.

The query includes one or more functions, which represent operations or transformations to be applied to the data within the shared dataset. Functions may include mathematical calculations, aggregations, filtering operations, or any other operations supported by the querying language. These functions define the specific analyses or actions to be performed on the dataset, enabling users to derive meaningful insights or manipulate the data according to their requirements. A non-limiting example of functions in a query include a select statement, a join operation, an aggregate function, a group by clause, a where clause, an order by clause, and/or the like. For example, query A can include a join function that joins data from the first dataset with the second dataset to generate the shared dataset.

Returning to FIG. 5, at operation 504, the data platform 102 accesses a first set of data from the shared dataset to perform the one or more functions, the first set of data including data accessed from a first row of the shared dataset. Upon receiving the query directed towards the shared dataset, the data platform 102 initiates the process of accessing the relevant data from the dataset.

The database platform 102 identifies and retrieves the data required to fulfill the requirements specified in the query, which in this example, is the shared dataset which was contributed by multiple entities in the cleanroom collaboration. The first set of data can include at least a subset of information retrieved from the shared dataset specifically to execute the functions specified in the query. This set of data may include rows, columns, or specific data points relevant to the analysis or operation defined by the query.

Returning to FIG. 5, at operation 506, the data platform determines that the row access policy is to be enforced in relation to the first query. The data platform can make this determination based on a context of the first query. In some cases, the data platform identifies the requested datasets, conditions, or parameters surrounding the execution of the first query to make such a determination. In some cases, contextual factors may include the identity of the data providers that provided the dataset, the identity of the user or application initiating the query, the nature of the data being accessed, the purpose of the query, and any relevant security or privacy considerations.

The data platform 102 can determine which datasets are required for the first query. For example, Query A requires the first dataset and the second dataset, whereas Query B requires the shared dataset and the third dataset.

The data platform 102 applies membership restrictions 602 to the data requested by the first query and determines that the row access policy is to be enforced. The data platform can base this determination by identifying that a row access policy is attached to a dataset. As such, the membership restrictions can be used to either show all or none of the dataset. The policy owner can determine which rows can be accessed in a query via the policy. In some cases, the row access policy is applied to only a portion of the dataset, such as a first row of the shared dataset (as described further herein). The row access policy can restrict use of data values stored in the first row.

Row access policies govern the access rights and permissions associated with individual rows of data within the shared dataset. The row access policy specifies restrictions and permissions regarding the use, retrieval, and/or manipulation of data values stored in specific rows of the dataset.

The database platform 102 evaluates the context of the first query to ascertain whether the enforcement of a row access policy is warranted. This determination is based on predefined rules, access controls, and security policies established for an individual query to ensure compliance with data privacy regulations and security requirements.

The row access policies are added to the datasets. Thus, the data platform can access certain datasets requested by the query and check whether row access policies of individual datasets enable comingling of data with other datasets, such as datasets that are external to the data cleanroom where the shared dataset was created.

Returning to FIG. 5, at operation 508, the data platform 102 generates an output to the first query based on the first set of data and the one or more functions. In some cases, the data platform 102 generates the output such that the output does not include data values stored in the first row in response to determining that the row access policy is to be enforced for the first query.

After accessing the first set of data from the shared dataset and performing the specified functions in the query, the data platform proceeds to generate an output. The output represents the result of the data analysis, manipulation, or processing conducted in response to the first query. Depending on the nature of the query and the functions applied, the output may include summary statistics, aggregated data, transformed datasets, or other relevant information derived from the initial dataset.

The output is generated by applying the one or more functions specified in the first query to the first set of data retrieved from the shared dataset. In some examples, the query also applies third party data, such as the third dataset from the third data provider, to the functions of the query. The third data provider may not be a member of the data cleanroom where the shared dataset was created and the data shared among the other data providers, such as the first or second data providers.

The data platform 102 excludes data values stored in the first row of the shared dataset from the output to the first query. This data platform 102 ensures compliance with the row access policy by omitting data values from the first row, thereby preventing unauthorized access or disclosure of sensitive information.

The enforcement of the row access policy extends to the generation of the output to the first query, even though the first query (e.g., query B) is external to the data cleanroom. By adhering to the restrictions imposed by the row access policy, the database platform 102 maintains data privacy and security standards within and external to the cleanroom environment, whereas traditional systems were only able to maintain privacy and security for data within the cleanroom.

Figure 7:
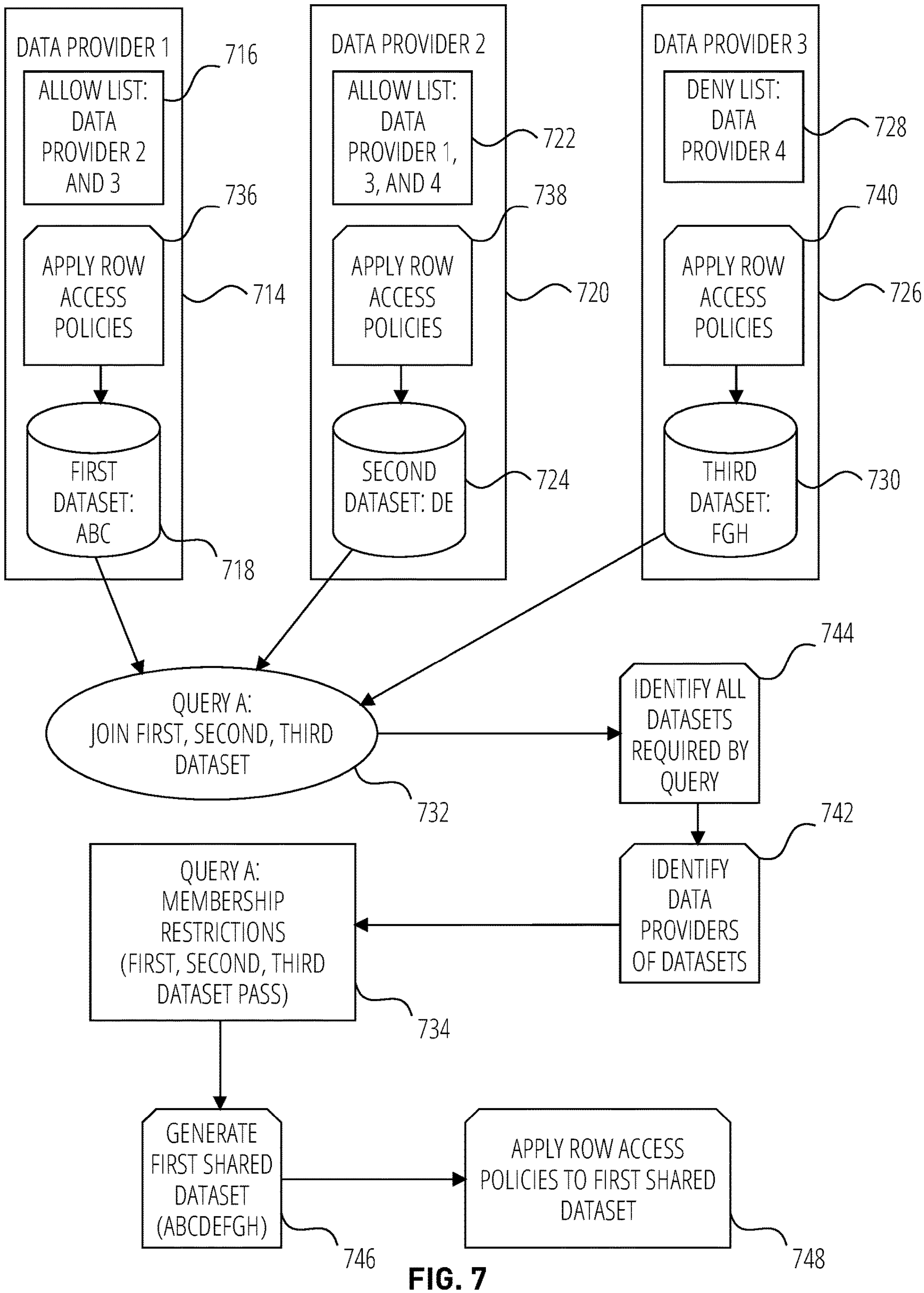
FIG. 7 is a diagram illustrating generation of a shared dataset without any membership restrictions being applied, according to some example embodiments.

FIG. 7 illustrates generation of a shared dataset without any membership restrictions being applied, according to some examples. Data provider 1 714 includes an allow list 716 of data providers 2 and 3. The data platform then applies row access policies 736 to the data of the first dataset 718 (e.g., to each row), which includes data ABC. Data provider 2 720 includes an allow list 722 of data providers 1, 3, and 4. The data platform then applies row access policies 738 to the data of the second dataset 724, which includes data DE. Data provider 3 726 includes a deny list 728 of data provider 4. The data platform then applies row access policies 740 to the third dataset 730, which includes data FGH.

In some cases, the allow list include organization names of entities, such as data providers, consumers executing a query, or other uses of the data platform. In some cases, the allow list includes account names of the data platform.

Data provider 2 requests query A 732 which joins the data from the first, second, and third dataset. At step 744, the data platform identifies all datasets required by query, which for query B is the first, second, and third datasets. At step 742, the data platform then identifies the data providers corresponding to the requested datasets, which for the first dataset is the first data provider, the second dataset is the second data provider, and the third dataset is the third data provider.

At step 734, the data platform applies membership restrictions to query A by identifying the lists provided by the data providers. Since the allow list from data provider 1 includes data providers 2 and 3, membership restrictions do not apply to the first dataset. Since the allow list from data provider 2 includes data providers 1 and 3, membership restrictions do not apply to the first dataset. Since the deny list from data provider 3 does not include data providers 1 and 2, membership restrictions do not apply to the first dataset.

Thus at step 746, the data platform generates the first shared dataset which includes all data from the first, second and third datasets: ABCDEFGH. In some cases, the first shared dataset already has row access policies already attached based on the datasets used to generate such first shared dataset. For example, the row access policies of the first, second, and third datasets are applied to the first shared dataset.

In other cases, the data platform then applies row access policies to the first shared dataset at step 748. In this example, data AB has the row access policy of only allowing data providers 2 and 3 access, data DE has the row access policy of only allowing data providers 1 and 3 access, and data FGH has the row access policy of only denying data provider 4 access.

In some cases, row access policies are not needed to be added such as if the shared dataset is a view where the data is not materialized, where data provided by each provider is already protected by corresponding member restriction row access policies for each provider already and there is no need to create or apply another row access policy for the first shared dataset. In some cases, if only the clean room participants decided to materialize the data, then the system adds additional policies to protect the newly materialized data.

Data C can have a variation of row access policies. For example, data C can have an allow list of data provider 1, 2, and 3, which is a combination of the allow list from data provider 1 and data provider 2. In some cases, data C can have an allow list of data provider 3, which only includes an intersection between the allowed list.

Figure 8:
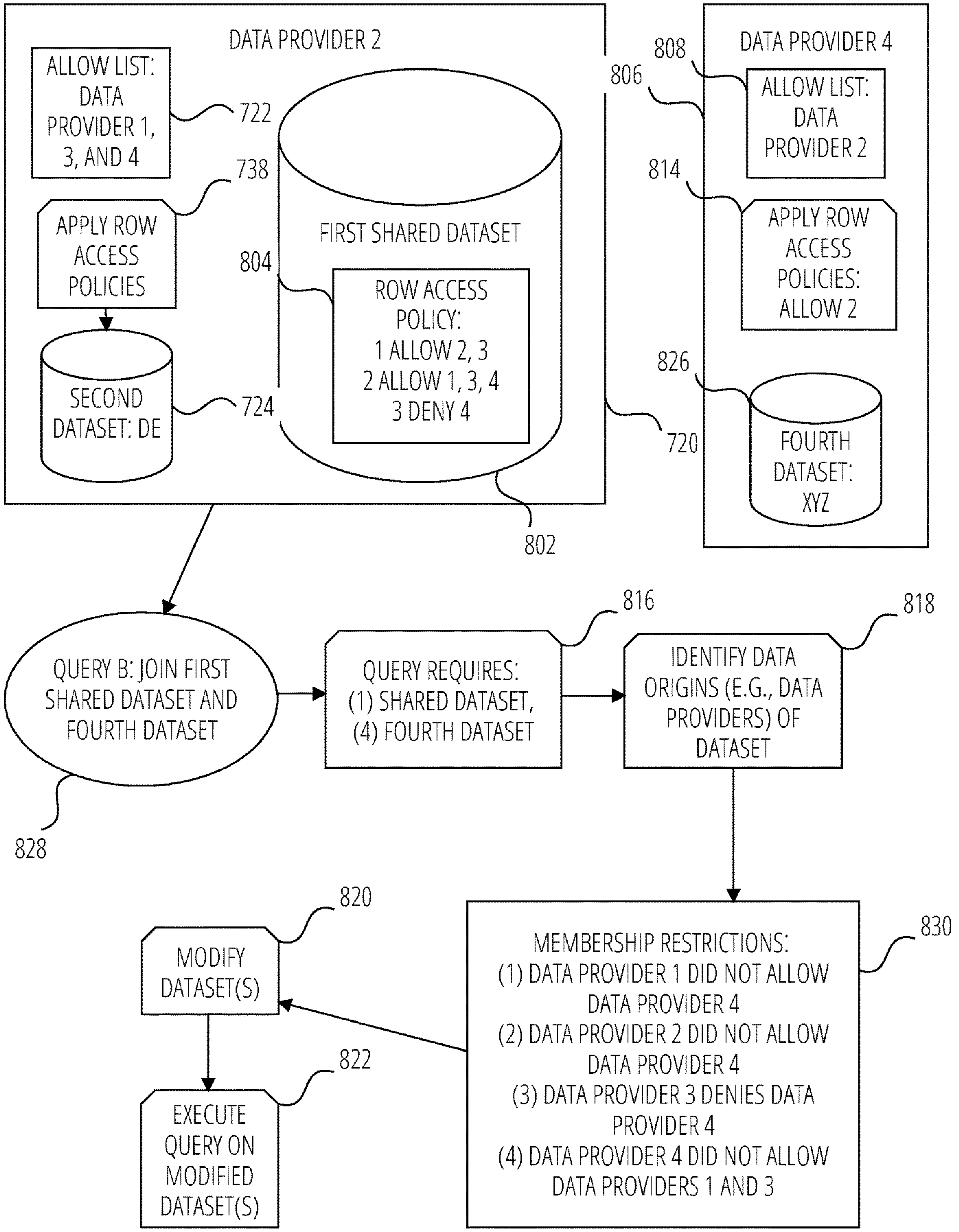
FIG. 8 is a diagram illustrating generation of another shared dataset with membership restrictions being applied, according to some example embodiments.

FIG. 8 illustrates generation of another shared dataset with membership restrictions being applied, according to some examples. The data provider 2 executed the query in FIG. 7, and thus has the first shared dataset 802. The first shared dataset 802 has the row access policies 804 applied to the dataset, where data provider 1 allows data providers 2 and 3, data provider 2 allows data providers 1, 3, and 4, and data provider 3 denies data provider 4 806.

The data provider 2 initiates a query B 828 that joins the first shared dataset with a fourth dataset 826 that includes data XYZ and is from data provider 4. Data provider 4 applies row access policies 814 based on the allow list 808 that allow data provider 2 to access data provider 4's data.

The data platform identifies all datasets that are required or requested by query B. For example at step 816, the data platform identifies that query B requires (1) the shared dataset and (4) the fourth dataset.

In some cases, direct and/or indirect data that is requested from the query is identified. For example, the query can request for a first data and a second data (direct data), where the second data is a view of third and fourth data (indirect data). Other types of indirect data can also be identified, such as data that is shared to one party and then reshared to another party.

At step 818, the data platform identifies the data origins, such as the data providers that originally provided the data, for the requested datasets. The shared dataset originated from data provider 1, 2, and 3, whereas the fourth dataset originated from data provider 4.

The data platform applies membership restrictions 830, by identifying the row access policies and comparing the row access policies with the originating data provider. For example, the row access policy for data provider 1 only includes data providers 2 and 3 to access data provider 1 data. Thus, at step 820, based on this membership restriction, the shared dataset is modified, and at step 822, the query is executed on the modified shared dataset with the fourth dataset.

The row access policy for data provider 2 includes data providers 1, 3, and 4, and thus does not have any applicable row access policies to be applied. However, the row access policy for data provider 3 explicitly denies data provider 4 to access data provider 3 data. Thus, at step 820, based on this membership restriction, the shared dataset can be modified, and at step 822, the query is executed on the modified shared dataset with the fourth dataset.

In some cases, the row access policy for data provider 4 only includes data provider 2 to access data provider 4 data. Thus, at step 820, based on this membership restriction, the shared dataset is modified, and at step 822, the query is executed on the modified shared dataset with the fourth dataset.

In some cases, rows, columns, lists, or individual entries of the datasets, the entire dataset, or otherwise a subset of the dataset can be set to 0 based on one or more features corresponding to membership restriction as disclosed herein. In some cases, rows, columns, lists, or individual entries of the datasets, the entire dataset, or otherwise a subset of the dataset is removed from input of the query.

In some cases, all datasets were determined to have membership restriction being applied. In such cases, the entity requesting the query can receive an empty result or an error notification that all datasets were modified or removed.

In some cases, the query is first executed. Then the data platform applies the row access policies to the output of the query (in reverse order as described in FIG. 7 and FIG. 8).

Figure 9:
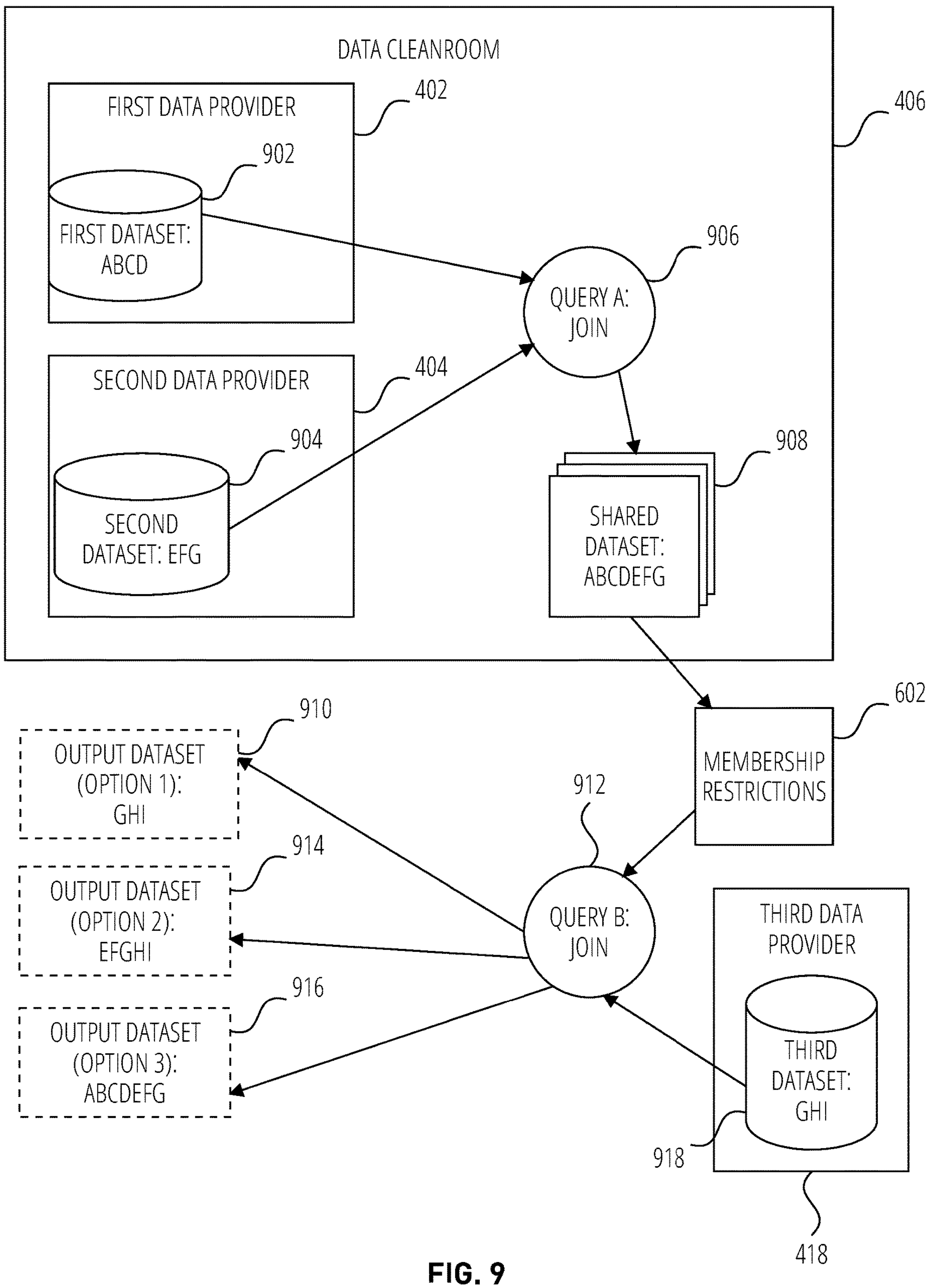
FIG. 9 is an architectural diagram illustrating variations on the application of row access policies, according to some example embodiments.

FIG. 9 illustrates variations on the application of row access policies, according to some examples. As shown, the first data provider 402 provides a first dataset 902 that includes data ABCD. The second data provider 404 provides a second dataset 904 that includes data EFG. The second data provider executes a first query, query A 906, within the data cleanroom joining the first dataset and the second dataset, creating a shared dataset 908 that includes data ABCDEFG, a combination of the data in the first dataset and the second data set.

The second data provider then executes another query, query B 912, another join function on the shared dataset and a third dataset 918 from a third data provider, the third dataset including data GHI. The data platform applies the membership restrictions 602 on the shared dataset and identifies that the first data provider has not included the third data provider in their allowed list for accessing their data. As a result, the row access policies are applied to the shared dataset.

In some cases, because the shared dataset is derived from the first dataset, the shared dataset is wholly excluded from the join function. As a result, the output dataset (option 1) 910 is returned, where only the third dataset is returned. Because the shared dataset was wholly excluded from the join function, the only input to the join function was the third dataset, resulting in only the third dataset to be outputted. In some cases, one or more options apply when a preexisting shared dataset had membership restrictions created outside of the context of cleanroom and was shared in the clean room, either automatically or manually when inputted into the cleanroom.

In some cases, the data platform identifies all data that is solely originated and/or derived from the first dataset and removes such data from the from the shared dataset to generate a modified shared dataset. For example, all rows of data solely originating or derived from the first dataset are removed from the shared dataset. The query then performs a join function on the modified shared dataset and outputs an output dataset (option 2) 914 that includes data EFGHI.

In some cases, because the shared dataset is derived from the first dataset, the third dataset is wholly excluded from the join function. As a result, the query outputs the output dataset (option 3) 916, where the shared dataset is returned. Because the third dataset was wholly excluded from the join function, the only input to the join function was the shared dataset, resulting in only the shared dataset to be outputted.

In some cases, the data platform implements a row access policy scheme on the source datasets, such as datasets of the first and second database accounts. In some example embodiments, the row access policy engine is implemented as a database object of a network-based database system that restricts source data of a database account for use sharing in the clean room.

In some example embodiments, a database object in the network-based database system is a data structure used to store and/or reference data. In some example embodiments, the network-based database system implements one or more of the following objects: a database table, a view, an index, a stored procedure of the database system, a user defined function of the database system, or a sequence. In some example embodiments, when the network-based database system creates a database object type, the object is locked and a new object type cannot be created due to the network-based database system restricting the object types using source code of the database system. In some example embodiments, when objects are created a database object instance is what is created by the database system as an instance of a database object type (e.g., such as a new table, an index on that table, a view on the same table, or a new stored procedure object).

The row access policy engine provides row-level security to data of the network-based database system through the use of row access policies to determine which rows to return in the query result. Examples of a row access policy include: allowing one particular role to view rows of a table (e.g., user role of a end-user issuing the query), or including a mapping table in the policy definition to determine access to rows in a given query result. In some example embodiments, a row access policy is a schema-level object of the network-based database system that determines whether a given row in a table or view can be viewed from different types of database statements including SELECT statements or rows selected by UPDATE, DELETE, and MERGE statements.

In some example embodiments, the row access policies include conditions and functions to transform data at query runtime when those conditions are met. The policy data is implemented to limit sensitive data exposure. The policy data can further limit an object's owner (e.g., the role with the OWNERSHIP privilege on the object, such as a table or view) who normally has full access to the underlying data. In some example embodiments, a single row access policy engine is set on different tables and views to be implemented at the same time. In some example embodiments, a row access policy can be added to a table or view either when the object is created or after the object is created.

In some example embodiments, a row access policy comprises an expression that can specify database objects (e.g., table or view), and use Conditional Expression Functions and Context Functions to determine which rows should be visible in a given context. The following is an example of a Row Access Policy being implemented at query runtime: (A) for data specified in a query, the network-based database system determines whether a row access policy is set on a database object. If a policy is added to the database object, all rows are protected by the policy. (B) The distributed database system then creates a dynamic secure view (e.g., a secure database view) of the database object. (C) The policy expression is evaluated. For example, the policy expression can specify a "current statement" expression that only proceeds if the "current statement" is in the approved statements table, or if the current role of the user that issued the query is a previously specified and allowed role. (D) Based on the evaluation of the policy, the restriction engine generates the query output, such as source data to be shared from a first database account to a second database account, where the query output only contains rows based on the policy definition evaluating to TRUE.

In some embodiments, the database platform implements a dynamic data masking scheme on the source datasets from the different database accounts. Dynamic Data Masking provides column-level security in which a masking policy selectively masks data at query time that was previously loaded in plain-text into the distributed database.

In some example embodiments, the restriction engine implements dynamic data masking policy as a schema-level object, in which a database and schema are to exist before a masking policy can be applied to a given column. In some example embodiments, at query runtime, the dynamic data masking policy is applied to the column at every location where the column appears (e.g., In any of the source datasets, which are then shared for queries to join and return results. In some example embodiments, dynamic data masking can implement role based limiting of columns and the source data may be visible through restriction engine in plain-text value format (e.g., full email address: abcdefg@mailservice.com), a partially masked value (e.g., abc####@mailservice.com), or a fully masked value (e.g., #######). In some example embodiments, the restriction engine 233 implements row access policy engine to restrict data at the row level and further implements dynamic data masking to restrict the clean room data at the column level.

Figure 10:
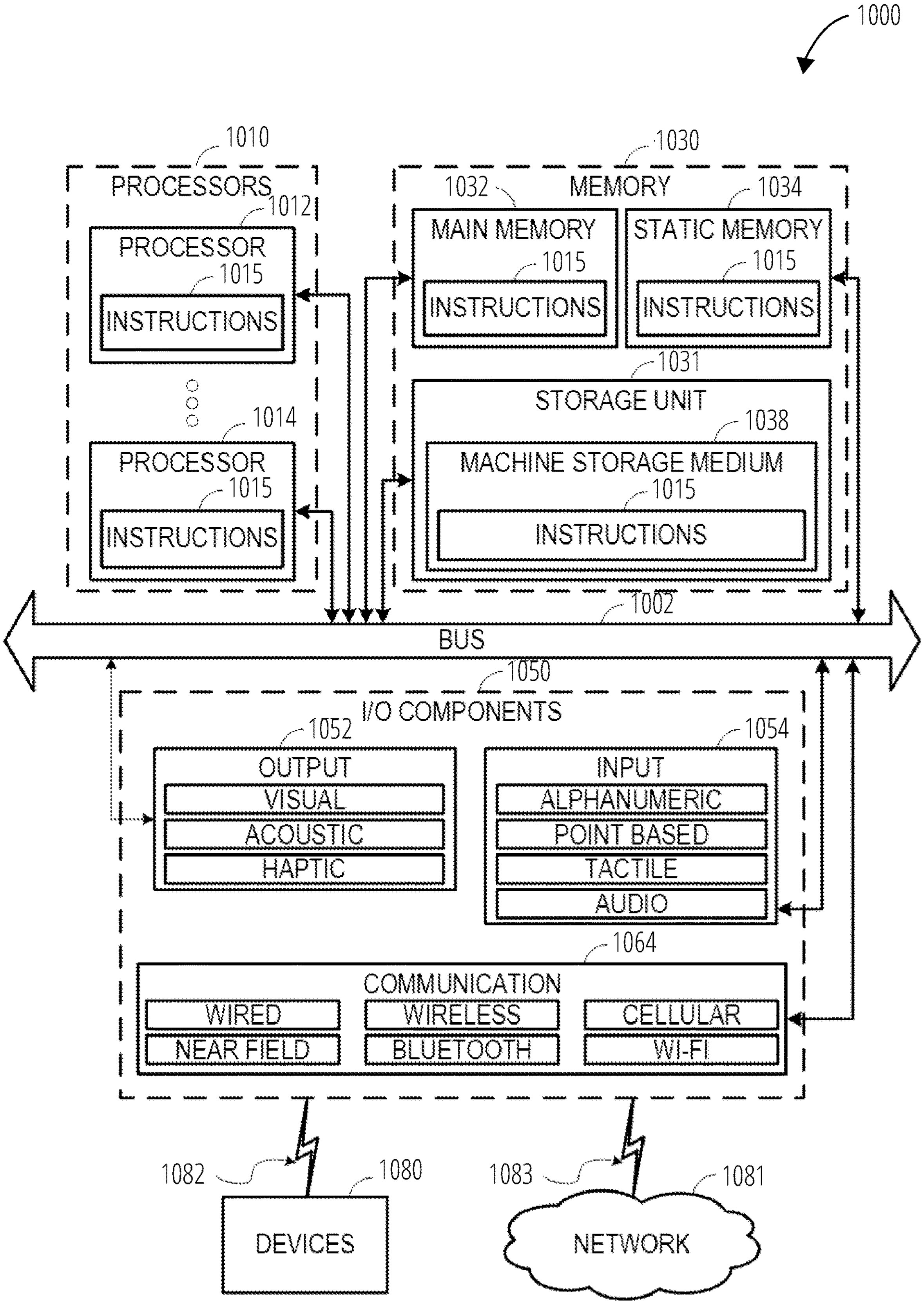
FIG. 10 is a block diagram illustrating a machine in the form of a computer system within which a set of instructions may be executed for causing the machine to perform any one or more of the methodologies discussed herein, according to some example embodiments.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1015 (e.g., software, a program, an application, an applet, an app, or other executable code), for causing the machine 1000 to perform any one or more of the methodologies discussed herein, may be executed. For example, the instructions 1015 may cause the machine 1000 to implement portions of the data flows described herein. In this way, the instructions 1015 transform a general, non-programmed machine into a particular machine 1000 (e.g., the client device 112 of FIG. 1, the compute service manager 108 of FIG. 1, the execution platform 110 of FIG. 1) that is specially configured to carry out any one of the described and illustrated functions in the manner described herein.

In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1015, sequentially or otherwise, that specify actions to be taken by the machine 1000. Further, while only a single machine 1000 is illustrated, the term "machine" shall also be taken to include a collection of machines 1000 that individually or jointly execute the instructions 1015 to perform any one or more of the methodologies discussed herein.

The machine 1000 includes processors 1010, memory 1030, and input/output (I/O) components 1050 configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), tensor processing unit (TPU), a radio-frequency integrated circuit (RFIC), another processor, or any suitable combination thereof) may include, for example, a processor 1012 and a processor 1014 that may execute the instructions 1015. The term "processor" is intended to include multi-core processors 1010 that may comprise two or more independent processors (sometimes referred to as "cores") that may execute instructions 1015 contemporaneously. Although FIG. 10 shows multiple processors 1010, the machine 1000 may include a single processor with a single core, a single processor with multiple cores (e.g., a multi-core processor), multiple processors with a single core, multiple processors with multiple cores, or any combination thereof.

The memory 1030 may include a main memory 1032, a static memory 1034, and a storage unit 1031, all accessible to the processors 1010 such as via the bus 1002. The main memory 1032, the static memory 1034, and the storage unit 1031 comprise a machine storage medium 1038 that may store the instructions 1015 embodying any one or more of the methodologies or functions described herein. The instructions 1015 may also reside, completely or partially, within the main memory 1032, within the static memory 1034, within the storage unit 1031, within at least one of the processors 1010 (e.g., within the processor's cache memory), or any suitable combination thereof, during execution thereof by the machine 1000.

The I/O components 1050 include components to receive input, provide output, produce output, transmit information, exchange information, capture measurements, and so on. The specific I/O components 1050 that are included in a particular machine 1000 will depend on the type of machine. For example, portable machines, such as mobile phones, will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1050 may include communication components 1064 operable to couple the machine 1000 to a network 1081 via a coupler 1083 or to devices 1080 via a coupling 1082. For example, the communication components 1064 may include a network interface component or another suitable device to interface with the network 1081. In further examples, the communication components 1064 may include wired communication components, wireless communication components, cellular communication components, and other communication components to provide communication via other modalities. The devices 1080 may be another machine or any of a wide variety of peripheral devices (e.g., a peripheral device coupled via a universal serial bus (USB)). For example, as noted above, the machine 1000 may correspond to any one of the client devices 112, the compute service manager 108, and the execution platform 110, and may include any other of these systems and devices.

The various memories (e.g., 1030, 1032, 1034, and/or memory of the processor(s) 1010 and/or the storage unit 1031) may store one or more sets of instructions 1015 and data structures (e.g., software), embodying or utilized by any one or more of the methodologies or functions described herein. These instructions 1015, when executed by the processors 1010, cause various operations to implement the disclosed embodiments.

Another general aspect is for a system that includes a memory comprising instructions and one or more computer processors or one or more hardware processors. The instructions, when executed by the one or more computer processors, cause the one or more computer processors to perform operations. In yet another general aspect, a tangible machine-readable storage medium (e.g., a non-transitory storage medium) includes instructions that, when executed by a machine, cause the machine to perform operations.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, (e.g., erasable programmable read-only memory (EPROM), electrically erasable programmable read-only memory (EEPROM), field-programmable gate arrays (FPGAs), and flash memory devices); magnetic disks such as internal hard disks and removable disks; magnetooptical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1081 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1081 or a portion of the network 1081 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1015 may be transmitted or received over the network 1081 using a transmission medium via a network interface device (e.g., a network interface component included in the communication components 1064) and utilizing any one of a number of well-known transfer protocols (e.g., hypertext transfer protocol (HTTP)). Similarly, the instructions 1015 may be transmitted or received using a transmission medium via the coupling 1082 (e.g., a peer-to-peer coupling) to the devices 1080. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1015 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

In some example embodiments, computer-readable files come in several varieties, including unstructured files, semi-structured files, and structured files. These terms may mean different things to different people. Examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data.

As used herein, examples of unstructured files include image files, video files, PDFs, audio files, and the like; examples of semi-structured files include JavaScript Object Notation (JSON) files, extensible Markup Language (XML) files, and the like. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

In a typical implementation, a cloud data platform 102 can include one or more databases that are respectively maintained in association with any number of customer accounts (e.g., accounts of one or more data providers), as well as one or more databases associated with a system account (e.g., an administrative account) of the data platform, one or more other databases used for administrative purposes, and/or one or more other databases that are maintained in association with one or more other organizations and/or for any other purposes. A cloud data platform 102 may also store metadata (e.g., account object metadata) in association with the data platform in general and in association with, for example, particular databases and/or particular customer accounts as well. Users and/or executing processes that are associated with a given customer account may, via one or more types of clients, be able to cause data to be ingested into the database, and may also be able to manipulate the data, add additional data, remove data, run queries against the data, generate views of the data, and so forth. As used herein, the terms "account object metadata" and "account object" are used interchangeably.

In an implementation of a cloud data platform 102, a given database (e.g., a database maintained for a customer account) may reside as an object within, e.g., a customer account, which may also include one or more other objects (e.g., users, roles, grants, shares, warehouses, resource monitors, integrations, network policies, and/or the like). Furthermore, a given object such as a database may itself contain one or more objects such as schemas, tables, materialized views, and/or the like. A given table may be organized as a collection of records (e.g., rows) so that each includes a plurality of attributes (e.g., columns). In some implementations, database data is physically stored across multiple storage units, which may be referred to as files, blocks, partitions, micro-partitions, and/or by one or more other names. In many cases, a database on a data platform serves as a backend for one or more applications that are executing on one or more application servers.

A database can include a repository of data for a customer of the cloud data platform, where the data is stored in tables that can be managed and queried. A database of the cloud data platform holds a collection of schemas, and a schema holds a collection of objects that can be tables and views. For example, a table stores data and can be queried. A view is a logical grouping (e.g., a SQL query) to create a virtual table that can be queried as if it was a real (e.g., non-virtual) table. A view may include, for example, a materialized view, which is a special view that provides a faster way to access tables. The materialized view is backed by physical (e.g., hidden) tables that can use different key orderings.

In the present disclosure, physical units of data that are stored in a cloud data platform—and that make up the content of, e.g., database tables in customer accounts (e.g., customer users)—are referred to as micro-partitions. In different implementations, a cloud data platform can store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the cloud data platform, a given file is referred to herein as an "internal file" and may be stored in (or at, or on, etc.) what is referred to herein as an "internal storage location." If stored external to the cloud data platform, a given file is referred to herein as an "external file" and is referred to as being stored in (or at, or on, etc.) what is referred to herein as an "external storage location."

While example embodiments of the present disclosure reference commands in the standardized syntax of the programming language Structured Query Language (SQL), it will be understood by one having ordinary skill in the art that the present disclosure can similarly apply to other programming languages associated with communicating and retrieving data from a database.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Also, in the above Detailed Description, various features can be grouped together to streamline the disclosure. However, the claims cannot set forth every feature disclosed herein, as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A computer system comprising:

at least one hardware processor; and one or more computer-storage media containing instructions that, when executed by the at least one hardware processor, cause the computer system to perform operations comprising:

receiving a first query directed towards a shared dataset, the first query including one or more functions;

accessing a first set of data from the shared dataset to perform the one or more functions, the first set of data including data accessed from a first row of the shared dataset;

determining, based on a context of the first query, that a row access policy is to be enforced in relation to the first query, the determining that the row access policy is to be enforced is based on determining that a row access policy is attached to a first row of the shared dataset, the row access policy restricting use of data values stored in the first row;

generating the shared dataset in a data cleanroom between at least a first data provider and a second data provider, wherein the first query is generated by the second data provider, wherein the first query requests access to an external dataset that is external to the data cleanroom;

identifying a subset of the data values in the first row that originate or are solely derived from the first data provider regardless of whether such data values also originate or are derived from another data provider; and executing the first query without an application of the subset of the data values stored in the first row;

generating an output to the first query based on an execution of the one or more functions, the output to the first query not including data values stored in the first row based on determining that the row access policy is to be enforced in relation to the first query.

2. The computer system of claim 1, wherein the external dataset is from a third data provider, wherein the third data provider is not a member of the data cleanroom.

3. The computer system of claim 1, wherein the first query is executed external to the data cleanroom to generate the output of the first query with data external to the data cleanroom.

4. The computer system of claim 1, further comprising generating the row access policy and applying the row access policy to the shared dataset in the data cleanroom in response to generating the shared dataset in the data cleanroom.

5. The computer system of claim 1, wherein the subset of the data values in the first row solely originate from the first data provider.

6. A method performed by at least one hardware processor performing operations, the method comprising:

receiving a first query directed towards a shared dataset, the first query including one or more functions;

accessing a first set of data from the shared dataset to perform the one or more functions, the first set of data including data accessed from a first row of the shared dataset;

determining, based on a context of the first query, that a row access policy is to be enforced in relation to the first query, the determining that the row access policy is to be enforced is based on determining that a row access policy is attached to a first row of the shared dataset, the row access policy restricting use of data values stored in the first row;

generating the shared dataset in a data cleanroom between at least a first data provider and a second data provider, wherein the first query is generated by the second data provider, wherein the first query requests access to an external dataset that is external to the data cleanroom;

identifying a subset of the data values in the first row that originate or are solely derived from the first data provider regardless of whether such data values also originate or are derived from another data provider;

executing the first query without an application of the subset of the data values stored in the first row; and generating an output to the first query based on an execution of the one or more functions, the output to the first query not including data values stored in the first row based on determining that the row access policy is to be enforced in relation to the first query.

7. The method of claim 6, wherein the external dataset is from a third data provider, wherein the third data provider is not a member of the data cleanroom.

8. The method of claim 6, wherein the first query is executed external to the data cleanroom to generate the output of the first query with data external to the data cleanroom.

9. The method of claim 6, further comprising generating the row access policy and applying the row access policy to the shared dataset in the data cleanroom in response to generating the shared dataset in the data cleanroom.

10. The method of claim 6, wherein the subset of the data values in the first row solely originate from the first data provider.

11. One or more machine-storage media containing instructions that, when executed by at least one hardware processor of a computer system, cause the computer system to perform operations comprising:

receiving a first query directed towards a shared dataset, the first query including one or more functions;

accessing a first set of data from the shared dataset to perform the one or more functions, the first set of data including data accessed from a first row of the shared dataset;

determining, based on a context of the first query, that a row access policy is to be enforced in relation to the first query, the determining that the row access policy is to be enforced is based on determining that a row access policy is attached to a first row of the shared dataset, the row access policy restricting use of data values stored in the first row;

generating the shared dataset in a data cleanroom between at least a first data provider and a second data provider, wherein the first query is generated by the second data provider, wherein the first query requests access to an external dataset that is external to the data cleanroom;

identifying a subset of the data values in the first row that originate or are solely derived from the first data provider regardless of whether such data values also originate or are derived from another data provider;

executing the first query without an application of the subset of the data values stored in the first row; and generating an output to the first query based on the execution of the one or more functions, the output to the first query not including data values stored in the first row based on determining that the row access policy is to be enforced in relation to the first query.

12. The one or more machine-storage media of claim 11, wherein the external dataset is from a third data provider, wherein the third data provider is not a member of the data cleanroom.

13. The one or more machine-storage media of claim 11, wherein the first query is executed external to the data cleanroom to generate the output of the first query with data external to the data cleanroom.

14. The one or more machine-storage media of claim 11, further comprising generating the row access policy and applying the row access policy to the shared dataset in the data cleanroom in response to generating the shared dataset in the data cleanroom.

15. The one or more machine-storage media of claim 11, wherein the subset of the data values in the first row solely originate from the first data provider.

* * * * *